United States Patent [19]

Eaton et al.

[11] 4,164,355

[45] Aug. 14, 1979

[54] CADAVER TRANSPORT

[75] Inventors: Russell K. Eaton; Ronald A. Elenbaas, both of Kalamazoo Township, Kalamazoo County, Mich.

[73] Assignee: Stryker Corporation, Kalamazoo, Mich.

[21] Appl. No.: 858,623

[22] Filed: Dec. 8, 1977

[51] Int. Cl.² ............................................. A61G 1/02
[52] U.S. Cl. ........................................ 296/20; 5/86; 135/5 A
[58] Field of Search ................. 296/20, 100; 135/5 R, 135/5.1, 5.2, 5.3, 1 A, 1 R, 4 R, 5 A; 5/88, 86, 92, 113, 368

[56] References Cited

U.S. PATENT DOCUMENTS

| | | | |
|---|---|---|---|
| 493,305 | 3/1893 | Sherman | 135/5.2 X |
| 1,273,599 | 7/1918 | Floyd | 5/88 |
| 1,984,681 | 12/1934 | Jackson | 135/5 A |
| 2,654,897 | 10/1953 | Knopf | 296/20 X |
| 3,147,497 | 9/1964 | Diaz | 5/368 X |
| 3,304,116 | 2/1967 | Stryker | 296/20 |
| 3,773,379 | 11/1973 | Loiseau | 296/100 |
| 3,820,838 | 6/1974 | Limpach | 296/20 |

FOREIGN PATENT DOCUMENTS 1000422  2/1952  France ...................................... 296/20

*Primary Examiner*—Joseph F. Peters, Jr.
*Assistant Examiner*—Michael Mar
*Attorney, Agent, or Firm*—Blanchard, Flynn, Thiel, Boutell & Tanis

[57] ABSTRACT

The transport for a cadaver has an undercarriage with four wheels arranged to define a rectangle. A pair of upright columns are mounted upon the undercarriage near opposite ends thereof and are connected at their upper ends to a frame which is preferably rectangular and elongated. The upright columns may include fluid pressure actuated cylinders which extend between the frame and the undercarriage. A canopy support is comprised of a pair of flat support members engageable at one edge of each to define a flat canopy support, each support member having a pair of legs rigidly secured at one end of each to the support member and pivotally connected at the other end of each to the frame whereby the support members can be pivoted between horizontal coplanar positions of engagement with each other and substantially upright positions at the opposite ends of the frame. A lock is provided to hold the support members in their horizontal positions, and a flexible canopy is adapted to be supported by the canopy support so that it encloses the top and sides of the space between the frame and the canopy support. A stretcher can be placed within the space upon the frame when the support members are in their upright positions.

11 Claims, 7 Drawing Figures

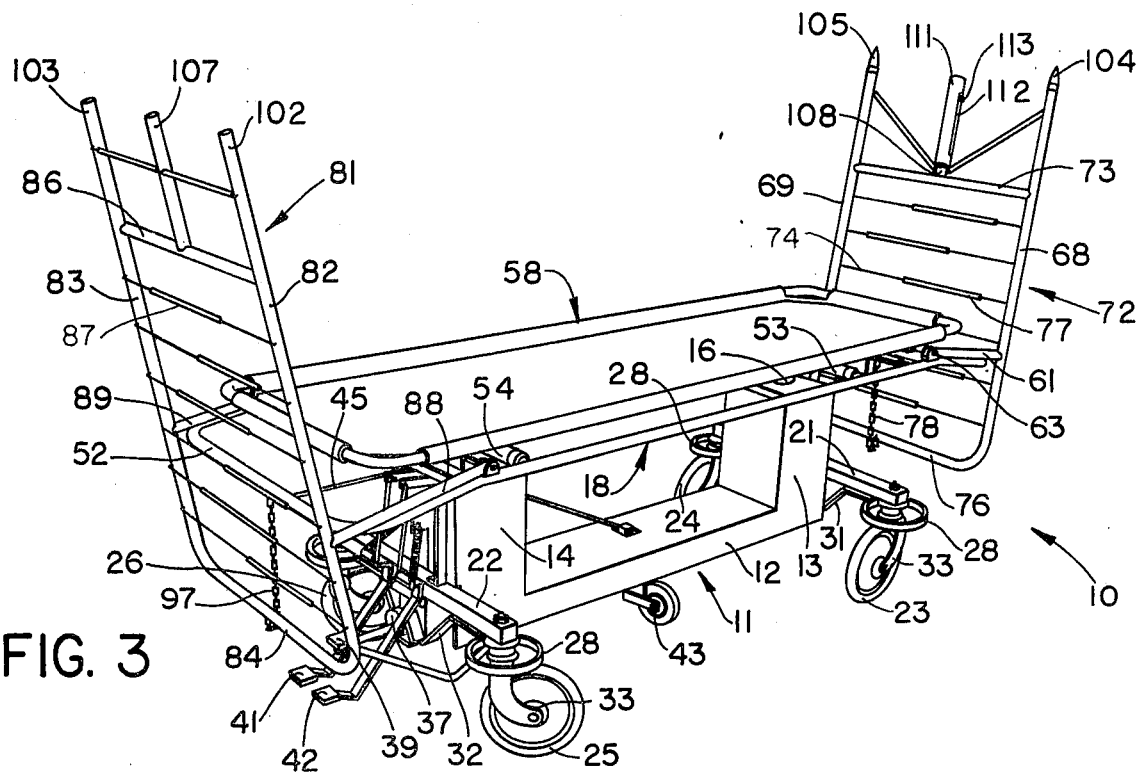
FIG. 3
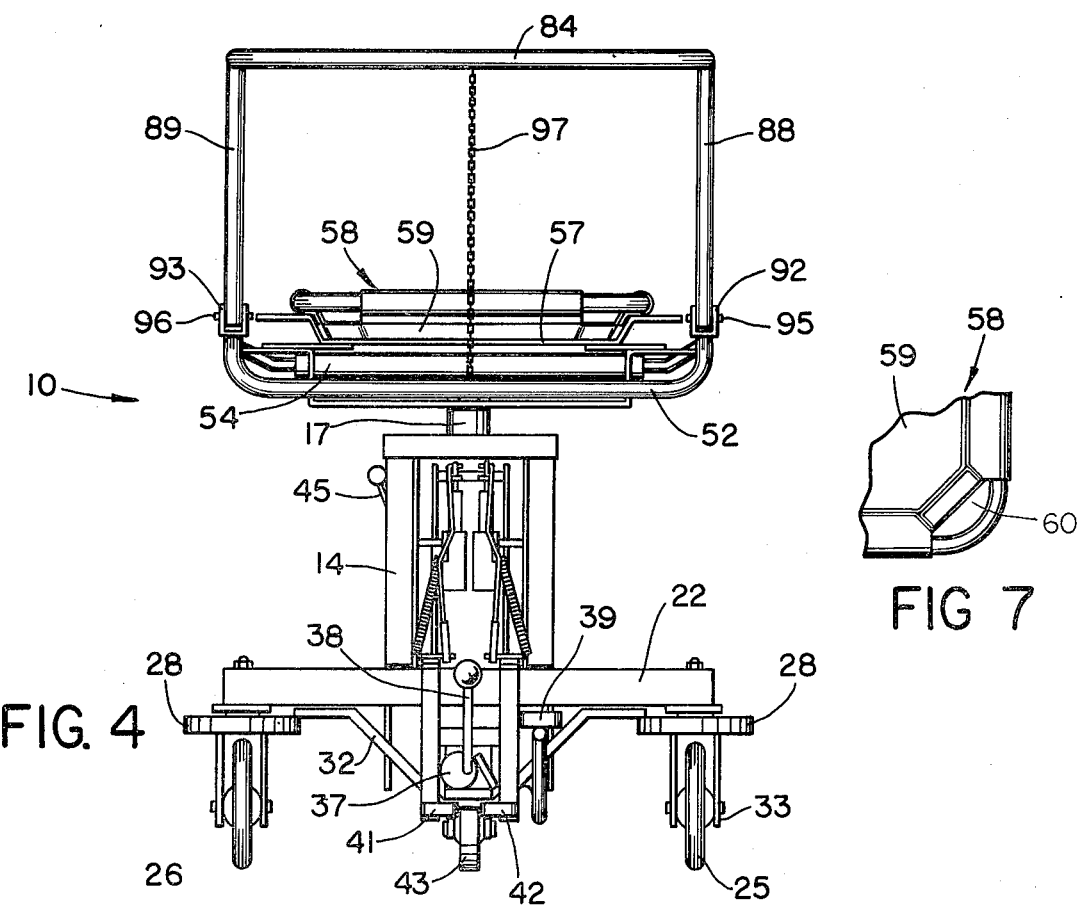
FIG. 4
FIG. 7

CADAVER TRANSPORT

BACKGROUND OF THE INVENTION

This invention relates in general to a wheeled transport for moving deceased persons, particularly in a hospital or clinic, from one location to another. More particularly, the invention is concerned with concealment of a cadaver being moved by such transport.

It is well known that persons who die in a hospital are usually placed upon a wheeled stretcher or other transport and a sheet is used to cover them as they are moved through the hospital halls. Seeing such a corpse can be a traumatic experience for a live patient, particularly one that is seriously ill. While some attempts have been made in the past to overcome this problem, they have not been fully satisfactory. In particular, the loading and unloading of the corpse relative to the transport has been difficult.

Accordingly, a primary object of this invention is the provision of a cadaver transport wherein the support, such as a stretcher, for the cadaver on the transport is easily and quickly accessible, wherein the top of the transport is at approximately the same level as a conventional patient transport, such as a wheeled stretcher, and wherein the transport can be quickly and easily converted into a substantially conventional transport for live patients.

A further object of the invention is the provision of a transport, as aforesaid, which can be operated by one adult to transfer a cadaver from a bed to the transport and then move the transport to another location.

BRIEF DESCRIPTION OF THE DRAWINGS

FIG. 3 is a perspective view similar to that shown in FIG. 2, but with the canopy support in its opened or raised position.

FIG. 4 is a rear end view of said transport with the canopy support in the closed position.

FIG. 7 is a fragmentary top view of a corner of the body supporting tray.

Figure 1:
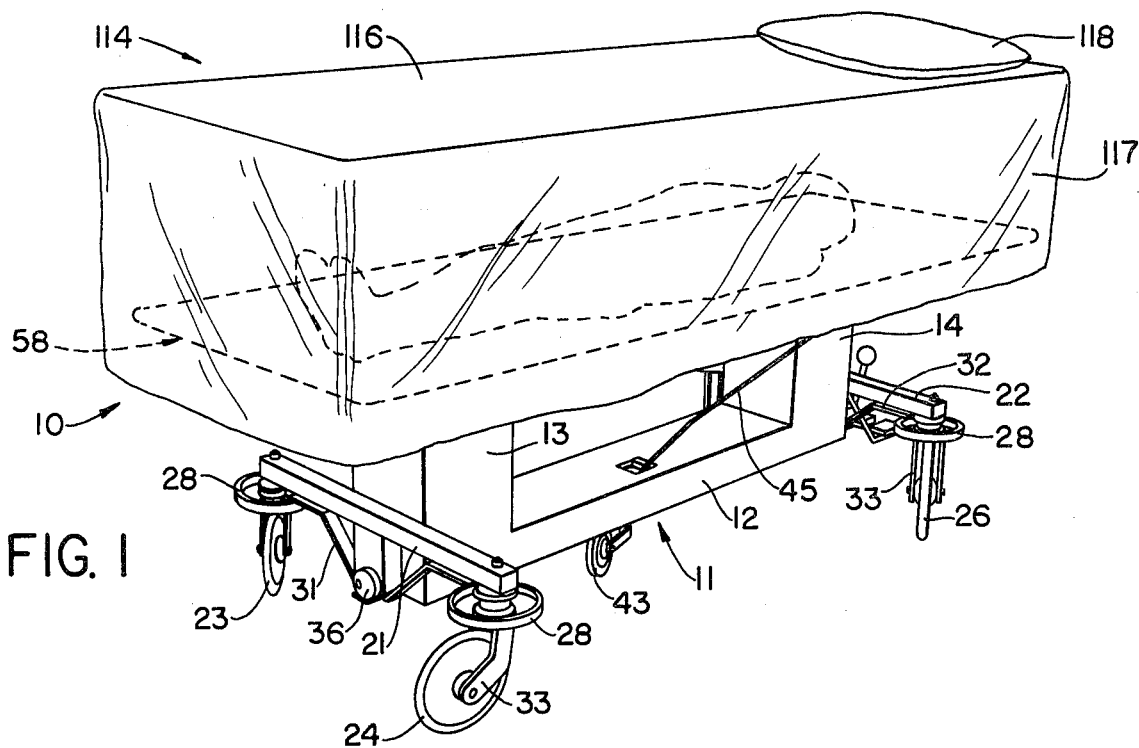
FIG. 1 is a perspective view of a transport embodying the invention.
Figure 2:
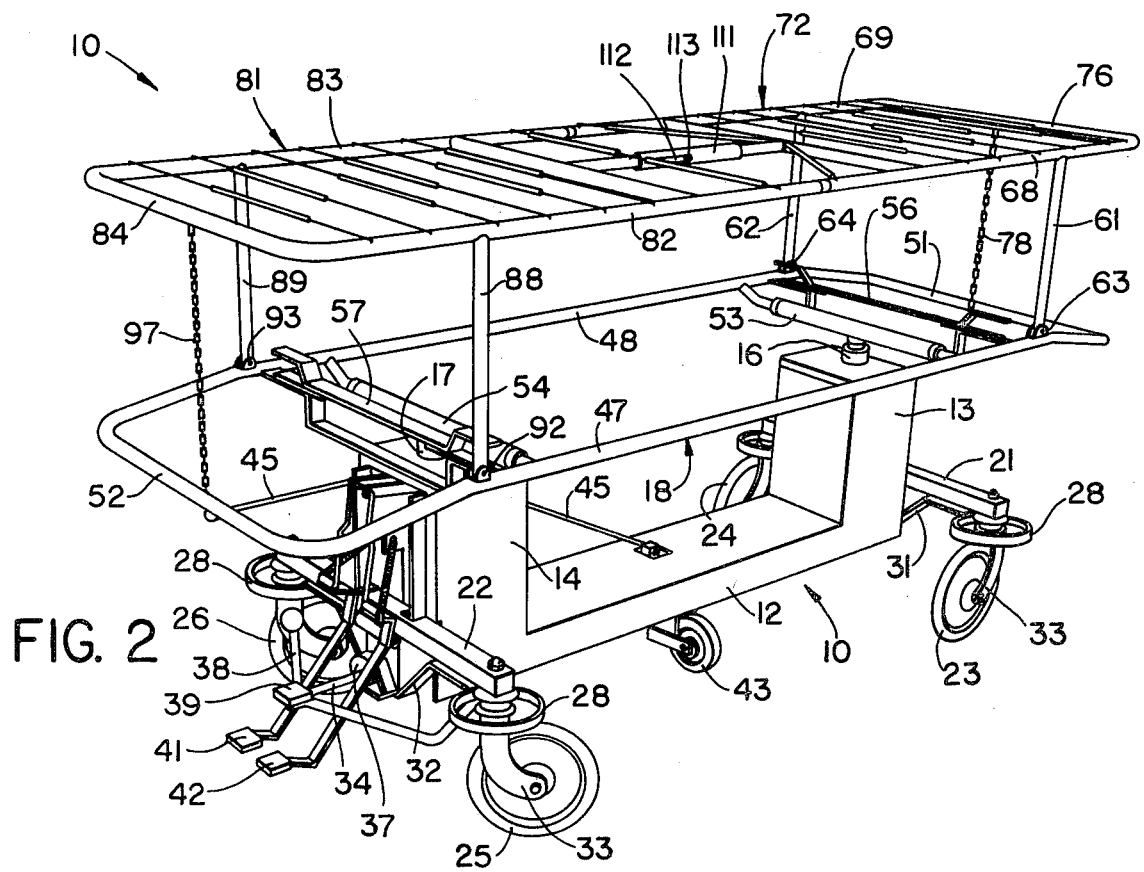
FIG. 2 is a perspective view of said transport as seen from the corner opposite to the one shown in FIG. 1, and with the canopy removed.

For the purpose of convenience in description, the terms "upper", "lower" and words of similar import will have reference to the transport as appearing in FIGS. 1, 2 and 4. The terms "front", "rear" and words of similar import will have reference to the right and left ends, respectively, of the transport as appearing in FIG. 5. The terms "inner", "outer" and derivatives thereof shall have reference to the geometric center of said transport and components thereof.

SUMMARY OF THE INVENTION

The objects and purposes of the invention, including those set forth above, have been met by providing a wheeled transport having a cadaver supporting frame and a canopy support spaced above said frame so that, when said canopy support is draped with a canopy, it looks like a conventional wheeled stretcher. The cadaver is placed upon a stretcher supported by the frame and beneath the canopy support. The canopy support is made up from a pair of flat support members which are pivotally mounted upon the frame for movement between horizontal, coplanar positions where they define the canopy support and substantially upright positions at the opposite ends of the supporting frame.

DETAILED DESCRIPTION

The cadaver transport 10, a preferred embodiment of which appears in FIGS. 1 and 2, is comprised of an undercarriage 11 which may be at least broadly similar to the undercarriage appearing in Stryker U.S. Pat. No. 3,304,116. That is, said undercarriage has a lengthwise beam 12 with a pair of upright columns 13 and 14 located at the front and rear ends, respectively, thereof. The columns 13 and 14 house fluid pressure actuated devices, such as hydraulic cylinders 16 and 17, the upper ends of which are connected to a frame 18.

A pair of horizontal and preferably parallel crossbars 21 and 22 are secured to the remote sides of the columns 13 and 14, respectively. Castered wheels 23, 24, 25 and 26 are supported on the four ends of the bars 21 and 22. Circular brakes 28 are mounted upon the opposite ends of the brake supports 31 and 32 so that they encircle the caster horns 33 and are movable downwardly for engagement with the peripheries of said wheels. Such downward movement is effected by eccentrics mounted upon the opposite ends of a rod 34 which extends lengthwise through the beam 12. The eccentrics 36 and 37 are engageable with said lock supports 31 and 32, respectively. The rod 34 is connected at its rearward end to a handle 38 which, when rotated counterclockwise, cause the brake supports 31 and 32 to be lowered whereby the brakes engage said wheels.

The hydraulic fluid for extending the hydraulic cylinders to raise the frame 18 is moved from a supply thereof, not shown, by pumping the pedal 39. The hydraulic fluid can be released from the front and rear hydraulic cylinders, whereby the frame is lowered, by simultaneously depressing the release pedals 41 and 42. These pedals 41 and 42 are connected by linkage to release valves in the supply lines of the hydraulic cylinders. The two hydraulic cylinders can be lowered independently by depressing one or the other of the pedals 41 and 42.

A fifth wheel 43 is mounted upon the lower side of the beam 12 and connected to a control handle 45 whereby the wheel 43 can be lowered or raised relative to the surface-supporting transport.

The frame 18 is comprised of a tubular member arranged in an elongated rectangle defined by side elements 47 and 48 and end elements 51 and 52. A pair of crossbars 53 and 54 are secured at the central portions thereof to the upper ends of the pistons on the hydraulic cylinders 16 and 17. The ends of the crossbars 53 and 54 are secured to the side elements 47 and 48. A pair of transverse support beams 56 and 57 extend between and are rigidly secured to the side elements 47 and 48 on the remote sides of the crossbars 53 and 54. The beams 56 and 57, as shown in FIG. 4 with respect to the beam 57, are provided to support the tray or stretcher 58. The tray 58, which is preferably metallic, has a recessed central portion 59 for containing involuntary body fluids and hand holds 60 at the four corners thereof.

Figure 6:
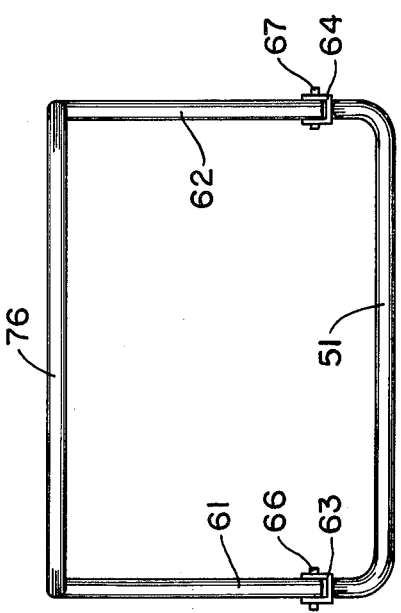
FIG. 6 is a fragmentary front end view of said transport.

A pair of legs 61 and 62 (FIG. 6) are pivotally connected to the brackets 63 and 64 by the pins 66 and 67, respectively. The upper ends of said legs 61 and 62 are rigidly secured to the side elements 68 and 69, respectively, of the flat, rectangular support member 72. Said legs 61 and 62 preferably extend perpendicularly from the plane of the support member 72 in the same direction and they are somewhat longer than the distance between the brackets 63 and 64 and the end element 51 of the frame 18. Thus, as appearing in FIG. 3, the support member 72 can pivot upwardly and outwardly until the legs 61 and 62 are resting upon the outer end portions of the side elements 47 and 48. Inasmuch as said end portions of the side elements are sloped downwardly slightly, said support member 72 will move slightly beyond its top dead center position during its outward movement.

The support member 72 has a cross bar 73 spaced substantially from the free ends of the side elements 68 and 69. Also, there are a plurality of substantially parallel stringers 74 which extend from the side element 68 to the side element 69 between the crossbar 73 and the end element 76 of the support member 72. Said stringers 74 have resiliently flexible means, such as coiled springs 77, therein to give some flexibility to said stringers.

A flexible element, such as the chain 78, is connected between the end element 76 and the end element 51 (FIG. 2) for the purpose of positively limiting pivotal movement of the support member 72 as it moves from its upright position of FIG. 3 into its horizontal position of FIG. 2.

The flat, rectangular support member 81 (FIGS. 2 and 3), which is similar to support member 72, has side elements 82 and 83 and an end element 84 which, as in support member 2, are preferably integral. The support member 81 has a crossbar 86 which is secured to and extends between the side elements 82 and 83 spaced from the free ends thereof. A plurality of resiliently flexible stringers 87 also extend from the side element 82 to the side element 83 between the end element 84 and the crossbar 86.

A pair of legs 88 and 89 are rigidly secured at one end of each of the side elements 82 and 83, respectively, and preferably extend perpendicularly in the same direction from the plane defined by the support member 81. The other ends of said legs 88 and 89 are pivotally connected respectively to the brackets 92 and 93 by the pins 95 and 96, FIG. 4. The brackets 92 and 93 are rigidly connected to the side elements 47 and 48 of the frame 18 at points spaced from the end element 52 a distance somewhat less than the lengths of the legs 88 and 89. Thus, the support member 81 can be pivoted into an upright position as described above with respect to the support member 72. A chain 97 is connected to and extends between the end element 84 and the end element 52 of the frame 18 for the purpose of positively opposing movement of the support member 81 downwardly away from its horizontal position of FIG. 2.

The side elements 82 and 83 of the support member 81 have hollow free ends 102 and 103, and the side elements 68 and 69 have tapered free ends 104 and 105 which are slidably received into the free ends 102 and 103, respectively, as the support members 72 and 81 are lowered from their upright positions of FIG. 3 into their horizontal positions of FIG. 2. These connections maintain the alignment of the two support members.

An elongated element 107, which may be tubular, is rigidly connected at one end to the crossbar 86 (FIGS. 3 and 5) preferably midway between the side elements 82 and 83 so that it extends parallel therewith approximately to a line extending between the ends 102 and 103 of said side elements. A elongated element 108 is rigidly secured to the crossbar 73 of the support member 72 preferably midway between the side elements 68 and 69 and parallel therewith. Said element 108 preferably extends to a point near but spaced inwardly from a line connecting the tips of the side elements 68 and 69. Accordingly, when the support members 72 and 81 are lowered into their FIG. 2 positions, the elements 107 and 108 are spaced slightly from each other.

Figure 5:
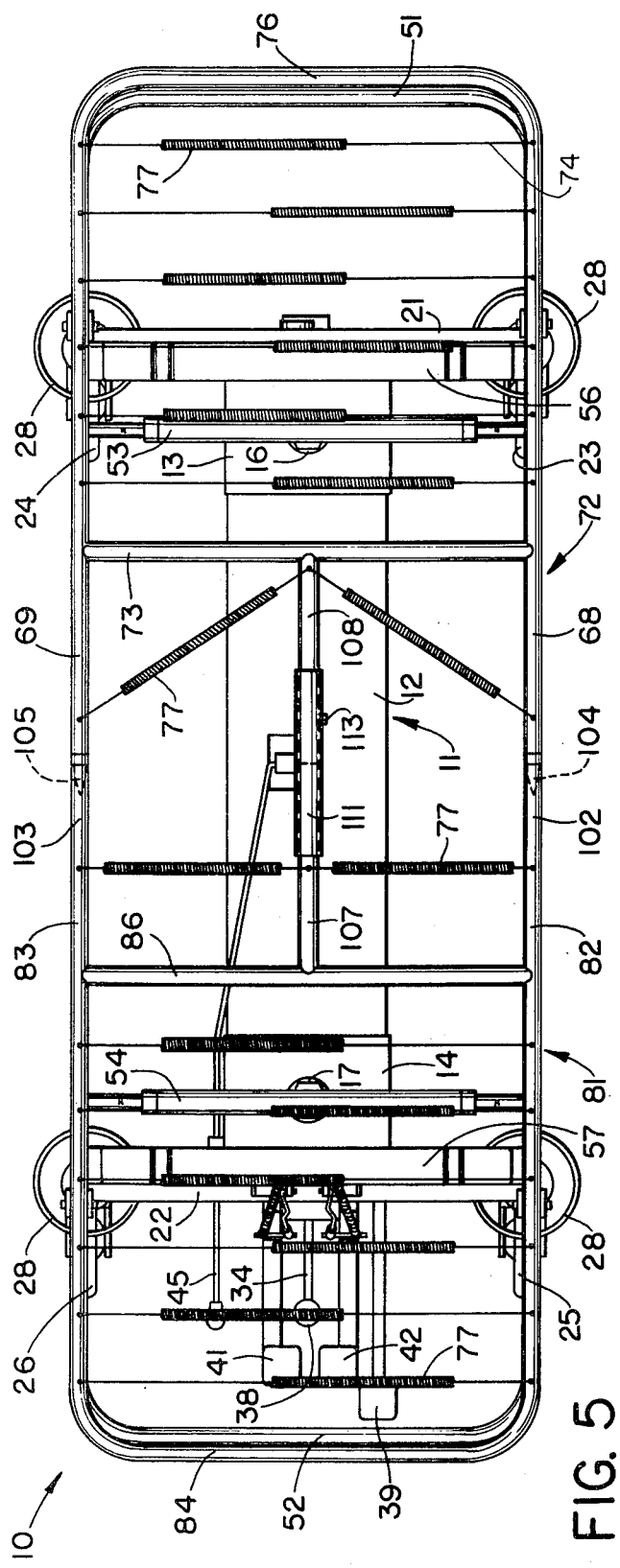
FIG. 5 is a top plan view of said transport with the canopy support in its closed or horizontal position.

A sleeve 111 (FIGS. 2 and 5) is slidably supported upon the element 108 for movement toward and away from a position, as shown in FIG. 5, where part thereof is telescopically received upon the element 107 while the remaining part of the sleeve is on the element 108, thereby locking the support members 72 and 81 in their horizontal positions. The sleeve 111 has a slot 112 in the side wall thereof and spaced from the ends thereof. A pin 113 is rigidly secured to the element 108 and extends through the slot 112 for the purpose of positively limiting the slidable movement of the sleeve 111 relative to the element 108.

The canopy 114 is preferably fabricated from cloth so that it resembles a typical covering used on a wheeled patient transport. The canopy has a top wall 116 and side walls or skirt 117 which are assembled together so that the canopy can be draped over the canopy support provided by the support members 72 and 81 when they are in their horizontal positions. In such case, the side walls 117 will normally extend below the frame 18 to complete the illusion of a typical patient transport. In order to augment this illusion, a pillow 118 may be placed upon the rear end of the canopy 114.

OPERATION

Although the operation of the above-described transport will be apparent from the description, a brief summary of the operation will be set forth hereinafter.

Under normal hospital conditions, the corpse will be in some type of hospital bed when the decease occurs. Accordingly, the transport will be moved adjacent to and parallel with the deceased person's bed after which the brakes 28 will be urged downwardly by the handle 38 so that they firmly engage and lock wheels 23, 24, 25 and 26 in place. Thus, the transport cannot move away from the deceased person's bed.

The sleeve 111 will then be moved off of the element 107 and completely onto the element 108 after which the support members 72 and 81 are moved from their FIG. 2 positions into their FIG. 3 positions. The hydraulic cylinders 16 and 17 are then actuated to raise the stretcher 58 approximately to the level of the bed upon which the cadaver is lying. Usually, the technician or other hospital employee will grasp the edge of the sheet upon which the cadaver is resting and pull it and the cadaver off of the bed and onto the stretcher. Thus, only one person is required to effect the transfer of the cadaver from the bed to the transport.

The hydraulic cylinders are then de-energized so that the frame 18 returns to its lowermost position, as shown in FIG. 2, with the cadaver supported upon the stretcher as shown in FIG. 1. The support members 72 and 81 are then returned from their upright positions of FIG. 3 to their horizontal positions of FIG. 2 with the tapered ends 104 and 105 being slidably received into the hollow ends of the side elements 82 and 83. The sleeve 111 is then moved axially onto the element 108 whereby the support members are locked in their horizontal positions. The canopy 114 is then draped over the canopy support members 72 and 81 so that it assumes the position appearing in FIG. 1. A pillow 118 can then be placed upon the rear end of the canopy, if desired.

While the transport 10 is designed for and intended to be used as a cadaver transport, it can be adapted quickly and easily for use as a conventional patient transport, if the need should arise. In order to accomplish this end, the pins 66 and 67 and the pins 95 and 96 are removed from the brackets 63 and 64 and the brackets 92 and 93, respectively, so that the support members 72 and 81, along with their legs, can be removed from attachment to the frame 18. If necessary, conventional restraining straps can be connected to the side elements 47 and 48 of the frame 18 and looped over the body of the patient in a conventional manner (not shown) while moving the patient from one place to another.

The fifth wheel 43 is normally lowered into its surface engaging position when the transport is being moved so that two of the castered wheels, normally the wheels 23 and 24 at the front end of the transport, will be raised slightly away from the floor. This gives the transport considerably better maneuverability and steering characteristics.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a wheeled transport having a compartment for concealing a cadaver, comprising an undercarriage having four wheels substantially arranged in a rectangle and for engagement with a substantially flat supporting surface;
   a substantially flat, rectangular and elongated frame means;
   a pair of spaced, upright means mounted upon said undercarriage and connected to said frame means for supporting same in a substantially horizontal position;
   an elongated and substantially flat cadaver support means mounted upon said frame means;
   an elongated substantially flat and rectangular canopy support means consisting of two similar and flat support members releasably connectible at adjacent edges, each of said support members being rigidly secured to corresponding ends of a pair of rigid elements which are substantially perpendicular to said support members, the other ends of which elements are pivotally connected to said frame means whereby said support members can be pivoted between coplanar horizontal positions and substantially upright positions at the opposite ends of said frame means;
   means for positively limiting movement of said support members toward and away from each other, said movement limiting means comprising flexible elements extending between and secured to the remote ends of said support members and the corresponding ends of said frame means, and tubular lock means at the adjacent ends of said support members; and
   a flexible canopy adapted to be draped over the canopy support means so as to conceal the space between said frame means and said canopy support means.

2. A transport according to claim 1, wherein said wheels are castered and said undercarriage includes manually operable brake means for positively resisting rotation of said casters and said wheels.

3. A transport according to claim 1, wherein said upright means include a pair of fluid pressure actuated cylinders and wherein said undercarriage includes manually operable means for effecting the extension and retraction of said cylinders.

4. A transport according to claim 1, wherein said undercarriage includes a fifth wheel approximately equidistant from said four wheels, and manually operable means for moving said fifth wheel into and out of engagement with said supporting surface.

5. In a wheeled transport for a cadaver, said transport having an undercarriage with four wheels substantially arranged in a rectangle and for engagement with a flat supporting surface, a substantially flat and elongated frame means, a pair of spaced, fluid pressure actuated means mounted upon said undercarriage and connected to said frame means for supporting same in a substantially horizontal position, control means for energizing and de-energising said fluid pressure actuated means to move said frame means toward and away from said undercarriage, and an elongated and rectangular cadaver support means mounted upon said frame means, the improvement comprising:
   first and second flat, similar and substantially rectangular support members releasably engageable with each other along an edge of each to provide a flat canopy support of about the same length and width as said cadaver support means;
   a pair of legs rigidly secured to and extending substantially perpendicularly away from the lateral edges of each of said support members and being pivotally secured at their other ends to said frame means for effecting pivotal movement of said support members between substantially horizontal positions of engagement and substantially upright positions at, but spaced from, the opposite ends of said cadaver support means;
   flexible element means connected between the remote ends of said support members and the corresponding ends of said frame means for positively resisting movement of the adjacent ends of said support members downwardly away from their upright positions;
   lock means connected between the adjacent ends of said support members for positively resisting movement of said support members from their horizontal positions towards their upright positions; and
   a flexible canopy adapted to enclose the sides and top of the space between the canopy support and the cadaver support means.

6. A transport according to claim 5, wherein said frame means is of approximately the same length and width as said canopy support; and
   wherein the length of said legs is slightly greater than the distance between their pivotal engagement with said frame means and the adjacent end thereof, said legs being in engagement with said frame means when said support members are in their substantially upright positions.

7. A transport according to claim 5, wherein the lock means between said support members consists of a pair of elongated elements rigidly secured, one each, to said support members and arranged to be adjacent each other and in axial alignment when said support members are in their horizontal positions, and an elongated tubular member slidably supported upon one of said elements for movement into and out of a telescoping position on both of said elements.

8. A transport according to claim 5, wherein said canopy support can be lowered by de-energizing said fluid pressure actuated means so that said canopy support is at approximately the same distance from said supporting surface as a wheeled patient support; and wherein said cadaver support means has a recessed central portion surrounded by a rim.

9. In a wheeled transport having a compartment for concealing a cadaver, comprising an undercarriage having four wheels substantially arranged in a rectangle and for engagement with a substantially flat supporting surface;

a substantially flat and elongated frame means;

a pair of spaced upright means mounted upon said undercarriage and connected to said frame means for supporting same in a substantially horizontal position;

an elongated and substantially flat cadaver support means mounted upon said frame means;

an elongated substantially flat and rectangular canopy support means comprising two similar and flat support members which are movable into a horizontal use position wherein the support members are disposed in adjacent and coplanar end-to-end relationship in the elongated direction of said transport, said canopy support means when in said horizontal use position defining a substantially horizontal support which is spaced upwardly from the cadaver support means to define a space therebetween, said canopy support means being at least substantially horizontally coextensive with said cadaver support means;

connecting means rigidly connected to each said support member and extending traversely therefrom and being hingedly connected relative to said frame means for permitting said support members to be solely swingably moved in opposite rotational directions from said horizontal use position into substantially upright storage positions wherein the support members are disposed adjacent the opposite ends of said frame means so that the cadaver support means is fully accessible from the side and top of the transport;

first means for positively limiting movement of said support members away from one another when said support members are in said upright storage positions;

second means for positively limiting movement of said support members toward one another when they are in said horizontal use position; and a flexible canopy adapted to be draped over the canopy support means when in said horizontal use position so as to conceal the space between said frame means and said canopy support means.

10. A transport according to claim 9, wherein each support member includes a pair of elongated and substantially parallel side elements which are rigidly joined together by at least one transversely extending cross element, said side elements being disposed in a horizontal plane and extending longitudinally of the transport when the respective support member is in said horizontal use position, said connecting means as associated with each said support member including a pair of leg structures which are disposed adjacent the opposite sides of the support member, each leg structure being rigidly connected at one end thereof to a respective side element and extending transversely therefrom so that the other end of said leg structure is pivotally connected to said frame means adjacent one side thereof.

11. A transport according to claim 10, wherein the respective support member when in said upright storage position projects vertically a substantial distance both downwardly below and upwardly above a horizontal plane defined by the flat cadaver support means.

* * * * *